United States Patent [19]

Richards et al.

[11] Patent Number: 5,056,293

[45] Date of Patent: Oct. 15, 1991

[54] APPARATUS FOR PRODUCING LAYERED TUBES OR RINGS

[75] Inventors: David C. Richards, Wokingham; Maurice S. Williams, Cranleigh; Brian Ward, Blackwater, all of United Kingdom

[73] Assignee: Process Improvements Limited, Berkshire, United Kingdom

[21] Appl. No.: 539,437

[22] Filed: Jun. 18, 1990

[30] Foreign Application Priority Data

Jun. 19, 1989 [GB] United Kingdom ............... 8914064

[51] Int. Cl.$^5$ .................. B65B 63/02; B65B 63/04; B65B 25/24; B65B 27/12

[52] U.S. Cl. .................................. 53/116; 53/527; 53/581; 53/241; 53/281; 53/330; 452/24; 452/29; 493/464

[58] Field of Search ............... 53/116, 117, 121, 409, 53/527, 520, 522, 258, 255, 526, 241, 281, 319, 330; 493/358, 380, 407, 413, 419, 423, 441, 442, 463, 464; 452/24, 29

[56] References Cited

U.S. PATENT DOCUMENTS

| | | | |
|---|---|---|---|
| 2,584,771 | 2/1952 | Wilkinson | 53/409 |
| 3,209,398 | 10/1965 | Ziolko | 452/24 |
| 3,315,300 | 4/1967 | Ziolko | 452/24 |
| 3,412,523 | 11/1968 | Raymond et al. | 53/581 |
| 3,745,611 | 7/1973 | Patouillard | 53/581 X |
| 4,590,742 | 5/1986 | Akesson | 53/116 X |
| 4,590,749 | 5/1986 | Temple et al. | 53/581 X |
| 4,683,615 | 8/1987 | Tomczak et al. | 452/24 |
| 4,773,127 | 9/1988 | Stall | 452/24 |
| 4,924,552 | 5/1990 | Sullivan | 452/24 |

*Primary Examiner*—Horace M. Culver
*Attorney, Agent, or Firm*—Shoemaker and Mattare, Ltd.

[57] ABSTRACT

An annular container mounted at the base of a passage between a layering tube and a central mandrel is charged with a layered tube of flexible tubing delivered over a floating mandrel when coaxially in contact with mandrel by driving rollers coacting with pinch rollers on the floating mandrel. The tubing passes over the mandrel and gathers in the layering tube while being compacted by two sets of shoes reciprocated 180° out of phase by rotating discs and connecting rods. When sufficient tubing has been delivered the floating mandrel is raised to enable a hot wire to pass between the mandrels to sever the tubing. The layering tube and central mandrel with the container can then be carried by a turntable through further stationary positions where the layered tubing is further compressed by reciprocable rings, a lid is put on the container to form a cassette and the cassette is discharged.

18 Claims, 8 Drawing Sheets

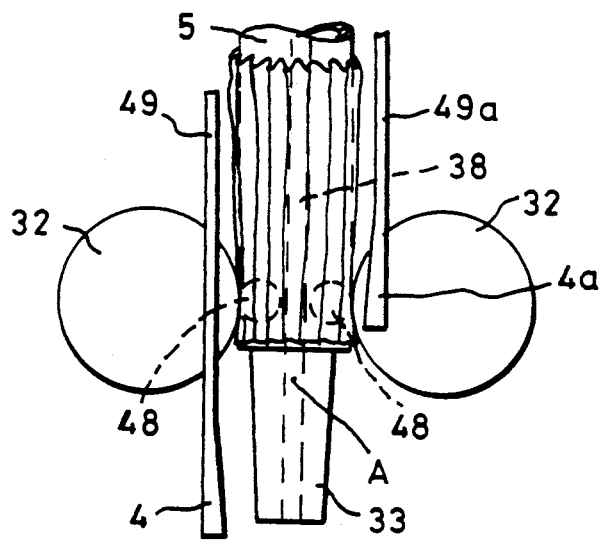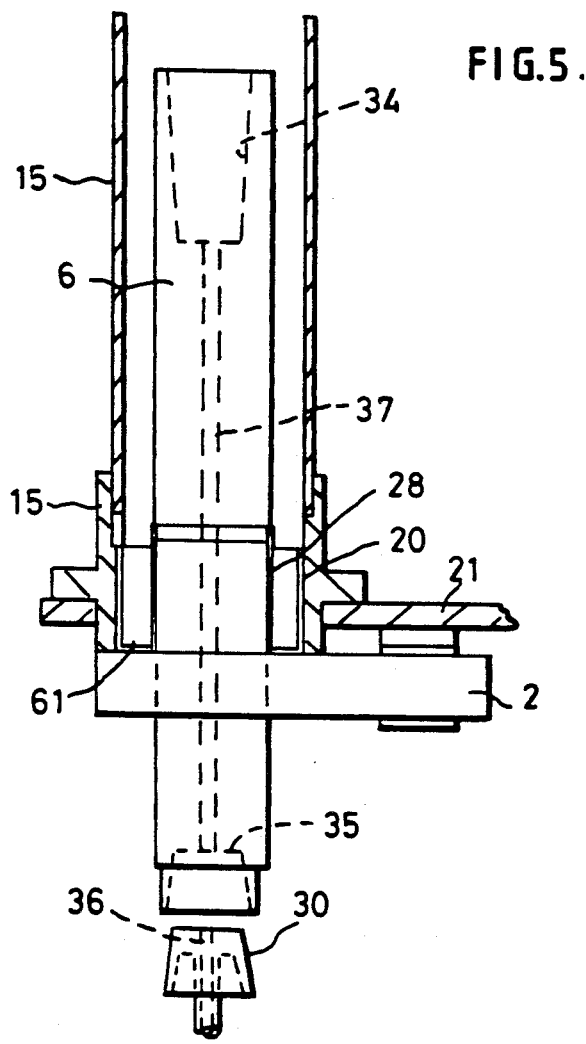
FIG.5.

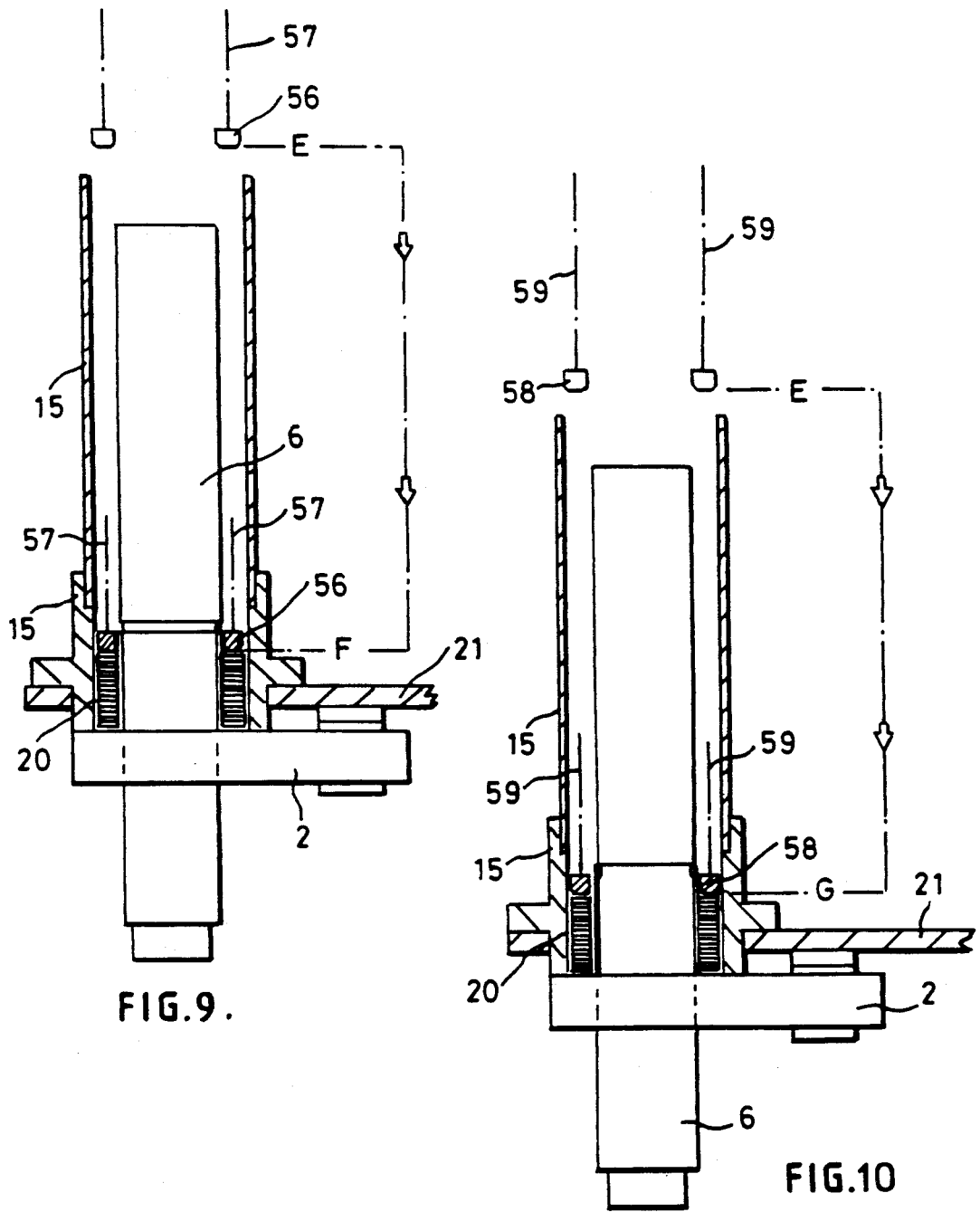

APPARATUS FOR PRODUCING LAYERED TUBES OR RINGS

FIELD OF THE INVENTION

This invention relates to apparatus for producing in series layered or pleated tubes or rings each consisting of a comparatively very long length of flexible, non-resilient tubing compacted into a very much shorter tube or ring constituting a unit to be used elsewhere for a particular purpose. Such a purpose may be the dispensing of the tubing in the tube or ring pack for packaging a series of objects respectively in individual packages along a length of the dispensed tubing.

DESCRIPTION OF THE PRIOR ART

In European patent application No. EP-A-0281355 a device is described for use with a cassette containing a tube or ring pack as aforesaid to be dispensed for the disposal of waste.

OUTLINE OF THE INVENTION

An object of the present invention is to provide an apparatus for the production in series of such layered or pleated tubes or rings at an economically high speed.

According to the present invention, apparatus for producing in series layered or pleated tubes or rings from a length of flexible, non-resilient tubing comprises a layering tube for controlling the outside diameter of the tubes or rings as they are formed, a central mandrel mounted inside the layering tube for controlling the inside diameter of the tubes or rings as they are formed, means closing the annular passage between the layering tube and central mandrel at one end thereof, means for feeding flexible, non-resilient tubing having a diameter appreciably larger than that of the central mandrel into the other end of the said passage at a rate such that the tubing gathers in the passage, means arranged to reciprocate inside the said passage to compact the tubing into layers or pleats as it gathers towards the closed end of said passage, means for severing a portion of the tubing so compacted from a remaining portion of the tubing, and means enabling a layered or pleated tube or ring when so compacted to be discharged from said passage. Where the tubing is to be packed in a container, such as the aforesaid cassette, an annular container may be mounted at the closed end of the said passage to receive the layered or pleated tube or ring as it is being formed and then to be discharged therewith. The container then has an outer wall contacting the inside surface of the layering tube and a tubular core fitting the central mandrel.

Very advantageously the layering tube and central mandrel may be mounted on a turntable arranged to be indexed round through a series of further stationary positions at which the layered tube or ring can be subjected to further treatment such as the closing of an annular container with a lid to form a cassette as aforesaid and the discharge of the cassette from the apparatus.

DESCRIPTION OF A PREFERRED EMBODIMENT

In order that the invention may be clearly understood and readily carried into effect an apparatus for gathering lengths of flexible tubular material into series of layered tubes or rings thereof will now be described, by way of example, with reference to the accompanying drawings, in which:

FIGS. 5 through 8 are diagrams showing a series of phases on the operation of the mechanism of FIGS. 1 through 4;

Figure 11:
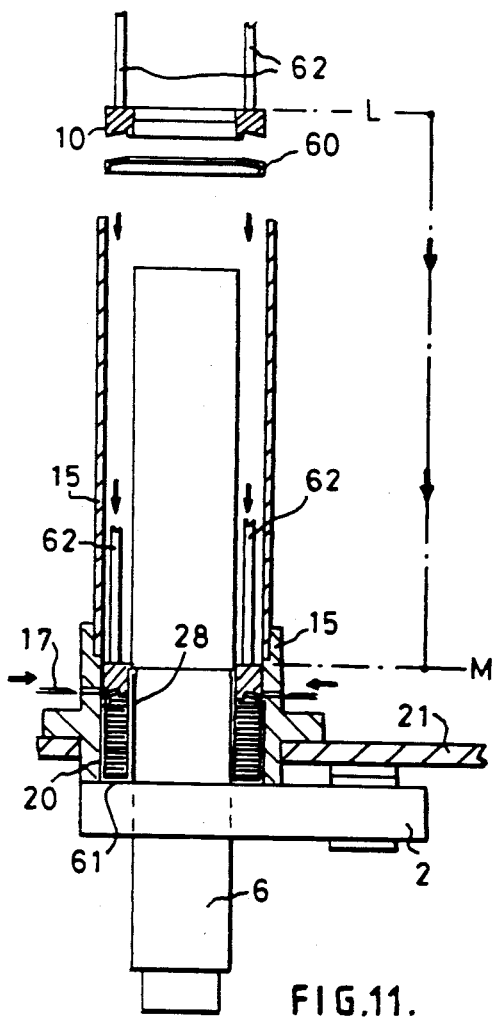
Figure 14:
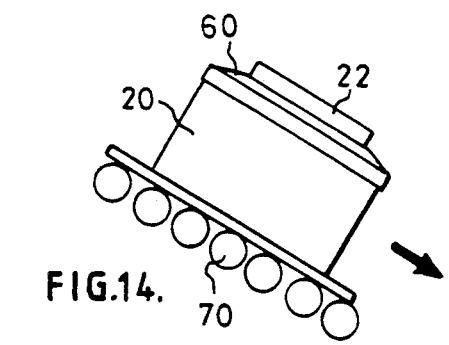
Figure 15:
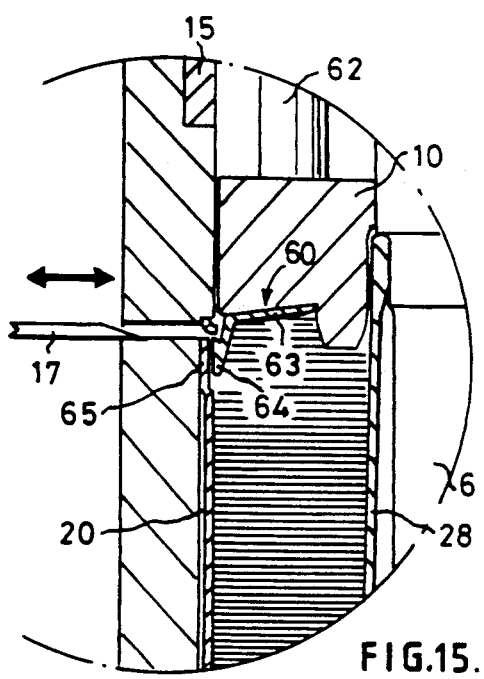
Figure 16:
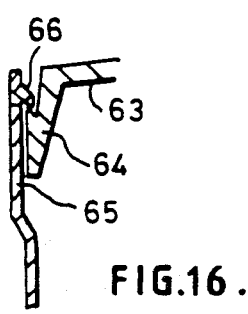
Figure 17:
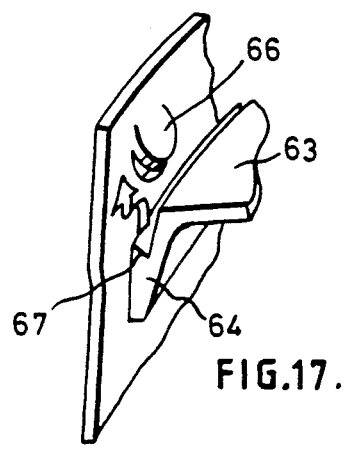

FIGS. 9 through 14 are diagrams showing a series of phases in the operation of mechanisms associated with the mechanism of FIGS. 1 through 4; and FIGS. 15 through 17 show details associated with FIG. 11.

Figure 1:
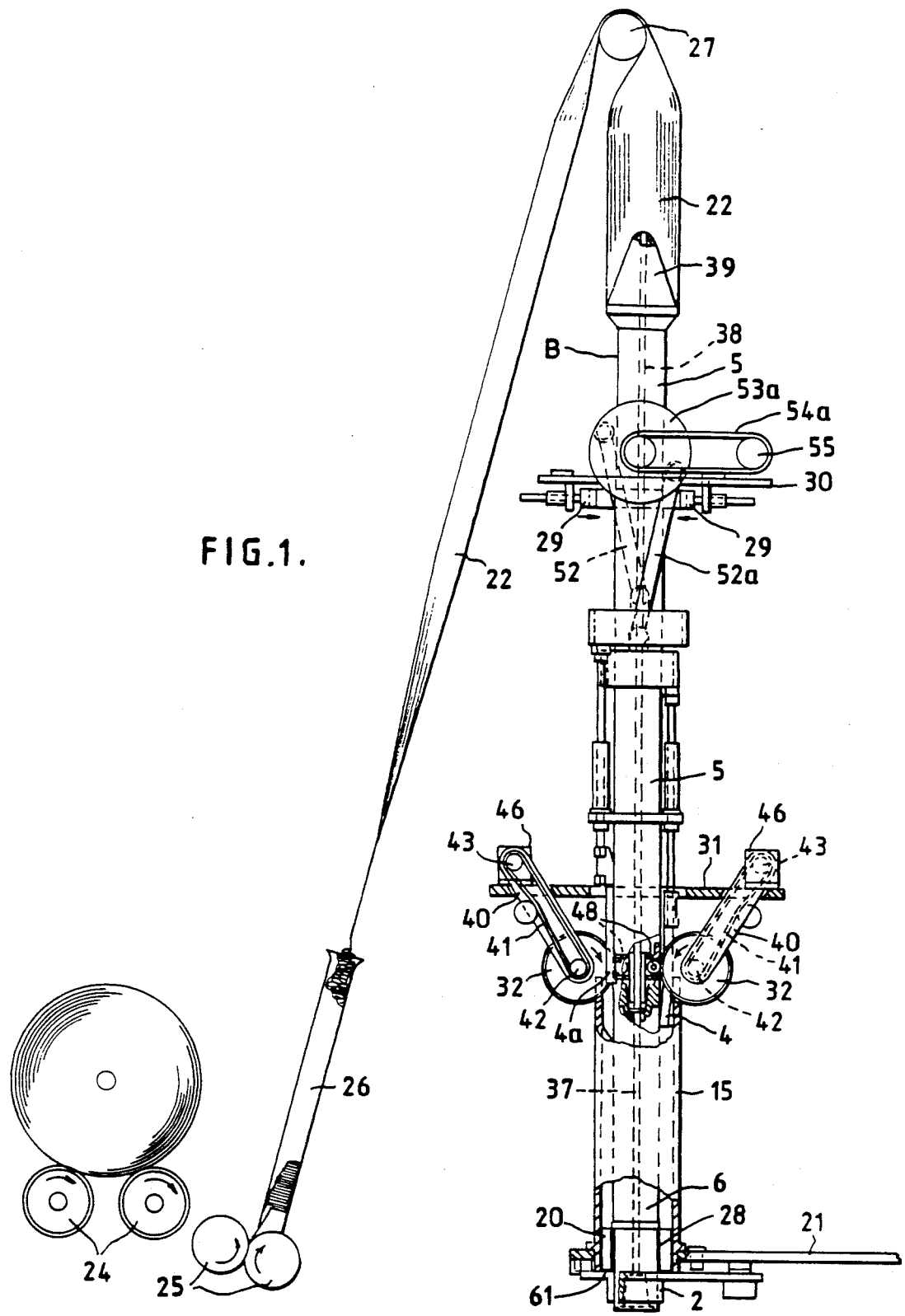
FIG. 1 is an elevation, shown partly in section, of mechanism for packing flexible tubular material into individual annular containers.
Figure 2:
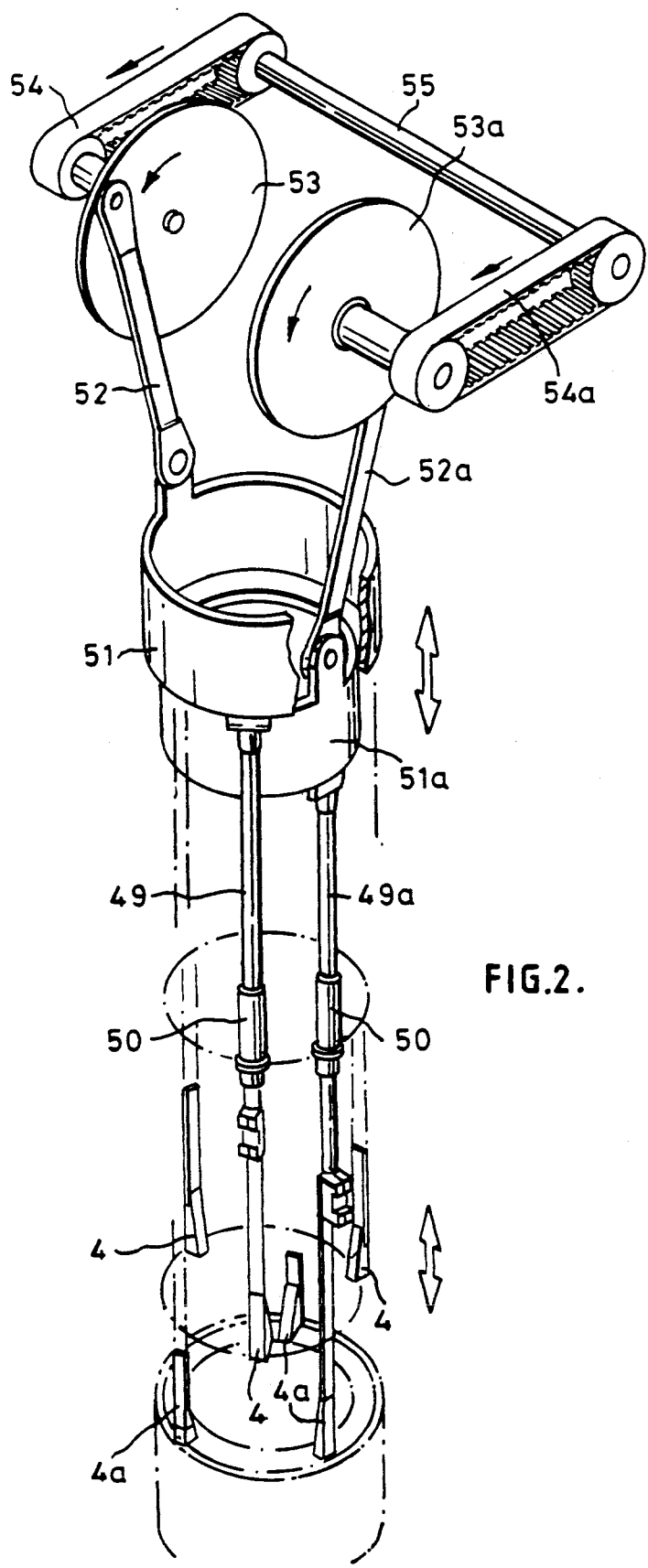
FIGS. 2, 3 and 4 are perspective views showing various details of the mechanism of FIG. 1.
Figure 3:
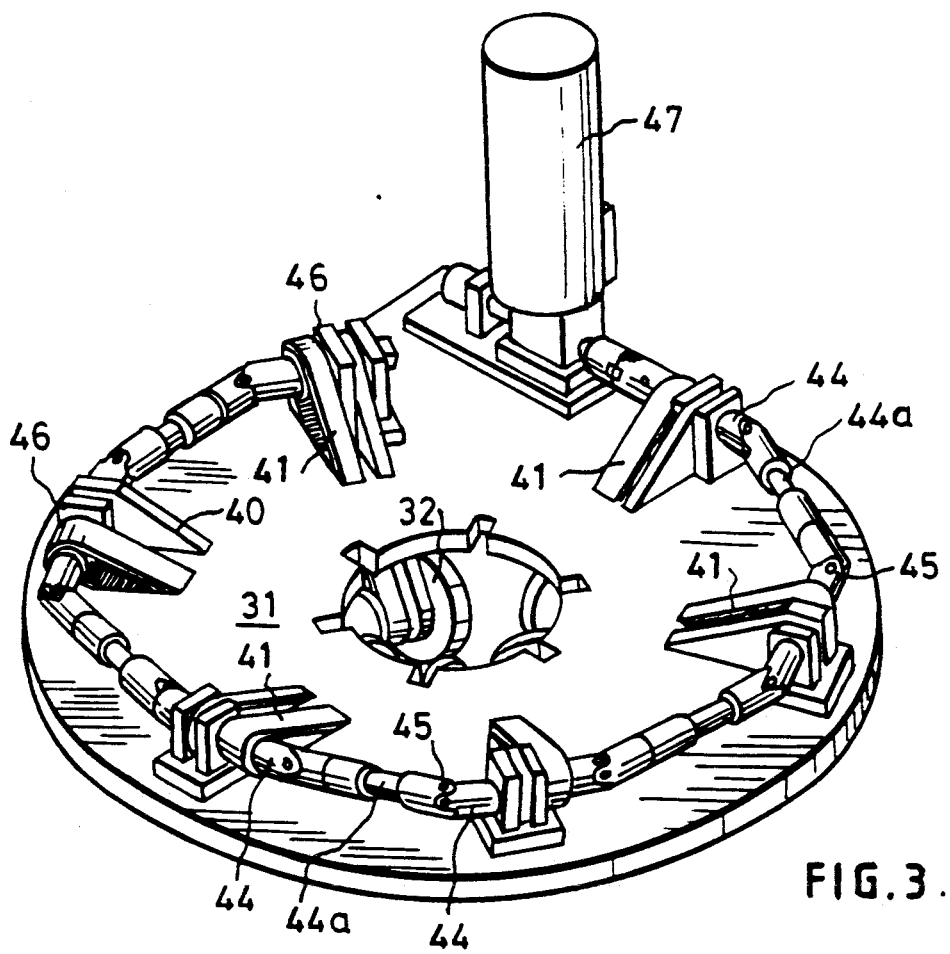
Figure 4:
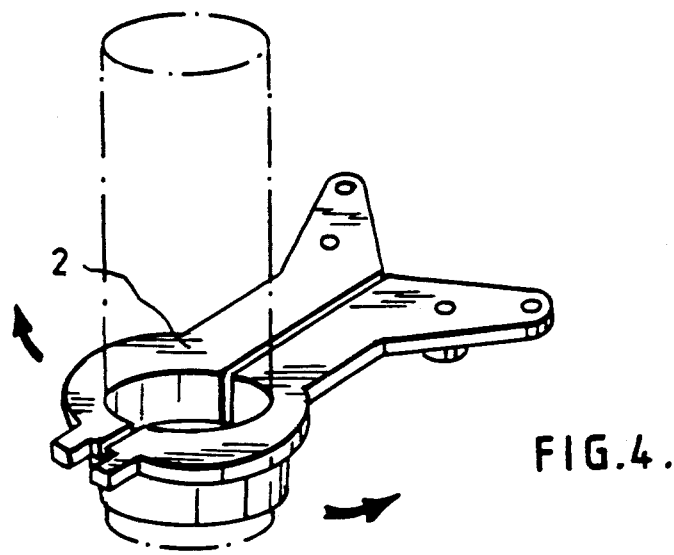

The mechanism of FIG. 1 is provided for effecting a basic phase in packing a mass of profusely and tightly layered non-resilient tubing in a container constituting the body 20 of a cassette as particularly described in applicant's co-pending British Patent Application No. 8818365.2. Such cassettes are fed in sequence on a turntable 21 in steps through six stations equidistantly spaced round the axis of the turntable. The mechanism of FIG. 1 may be regarded as located at station I, the body 20 having previously been located at station VI (not shown in drawings) in the position shown on the turntable 21.

The tubing 22, which may be high density polyethylene tubing having a 12 micron wall thickness and 6 inches (15.24 cm) diameter corresponding to the outer diameter of the annular space shown in the body 20. However, it will be appreciated that the invention can be adapted to a wide variety of types of tubing and dimensions. The tubing is derived from a roll 23 thereof resting on rollers 24. Pinch rollers 25 are arranged to withdraw the tubing and thrust it into a reservoir container 26 to provide an amorphous reservoir from which the tubing can be drawn upwards to pass over a roller guide 27 prior to travelling over a floating mandrel 5 and a central mandrel 6 to be layered in a layering tube 15 for packing into the body 20.

Figure 6:
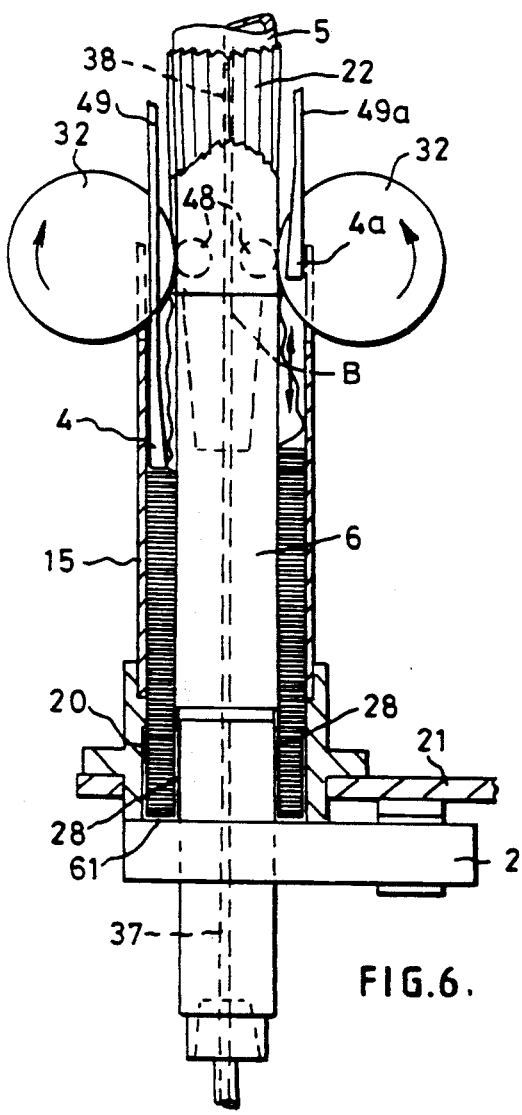

Each of the six positions on the turntable is furnished with a layering tube 15 and with a central mandrel 6 which has an appropriately smaller diameter than the tubing 22 and which can slide vertically in the turntable but, for example at station I, is held fixed on the turntable by a split clamp 2 (see also FIG. 4) having pivoted jaws. The floating mandrel 5, however, is unique to station I. As shown in FIGS. 1, 5 and 6, the cassette body 20 has a central tubular core 28 that fits on the central mandrel 6. The core 28 is joined to the body 20 by an annular base wall 61. The internal diameter of the core is 4 inches (10.16 cm) and the diameter of the body 20 is approximately 6 inches (15.24 cm).

At the beginning of a cycle of operations the floating mandrel 5 is in the raised position A shown in FIG. 5, being clamped in that position by pneumatically actuated clamps 29 (FIG. 1) which also clamp the tubing on the mandrel 5. These clamps 29 are mounted on a platform 30 which is then operated to lower the floating mandrel 5 to the position B of FIGS. 1 and 6. Simultaneously a mounting plate 31 carrying drive rollers 32 (described below) is lowered to carry the rollers 22 to the position of FIG. 6. A tapered lower end 33 of the floating mandrel 5 is consequently located in a tapered recess 34 (FIG. 5) in the central mandrel 6 and an air supply 30 is simultaneously inserted into a recess 35 at the bottom of the central mandrel 6. This member 30, the central mandrel 6, and the floating mandrel 5 are formed with axial passages 36, 37, 38 respectively leading to the top end of a deblocking cone 39 at the top of the floating mandrel to enable a supply of compressed air to form an air bubble in the tubing above the cone to facilitate the passage of the tubing over the cone when being fed towards the body 20.

This feeding forward of the tubing 22 is effected, after the clamps 29 have been withdrawn, by the drive rollers 32 (FIG. 1). There are six of these rubber covered drive rollers mounted on horizontal axes, located at the ends of arms 40 equidistantly distributed round the floating mandrel. Each drive roller 32 is driven by its own individual belt 41 between spools 42, 43 on the drive roller and an associated one of six shafts 44 (FIG. 3) connected together by intervening shafts 44a and universal joints 45 to form a ring carried in bearings 46 on the mounting plate 31. An electric motor 47 drives the shafts 44 about their respective axes. Each drive roller 32 engages a respective one of six pinch rollers 48 mounted in the floating mandrel freely to rotate therein with the tubing material intervening between the engaging drive rollers and the pinch rollers. Thus, the drive rollers in feed the tubing forward to become layered between the central mandrel 6 and the layering tube 15.

As the tubing is being delivered into the layering tube 15 it is cleared away from the drive rollers 32 and compacted by two groups of three compacting shoes 4, 4a (FIG. 2) inter-digitated about the floating mandrel 5. The groups of shoes 4, 4a are carried by stems 49, 49a guided by sleeves 50 and connected to rings 51, 51a respectively connected by connecting rods 52, 52a to crank pins on discs 53, 53a rotated through belts 54, 54a by a power driven shaft 55, the shaft 55 being electrically driven. The crank pins are 180° out of phase so that the groups of shoes 4, 4a compress the pleated tubing alternately.

Figure 7:
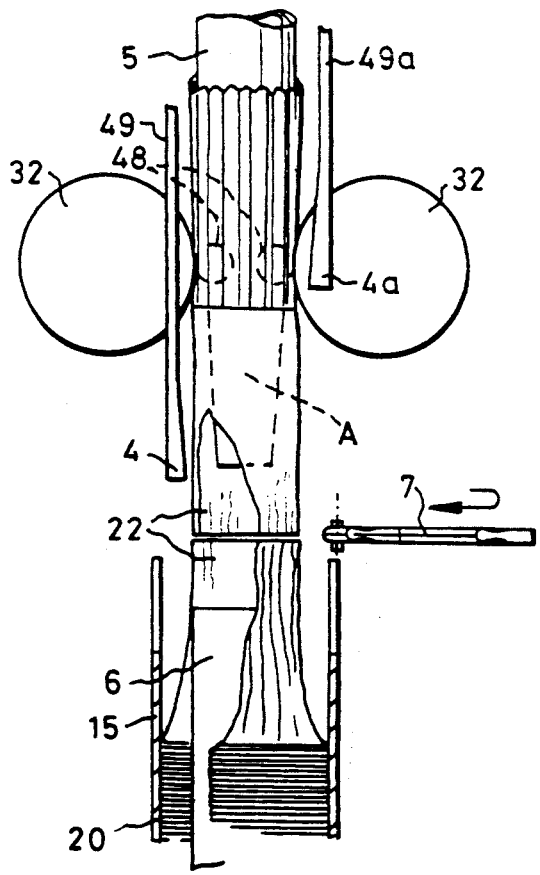
Figure 8:
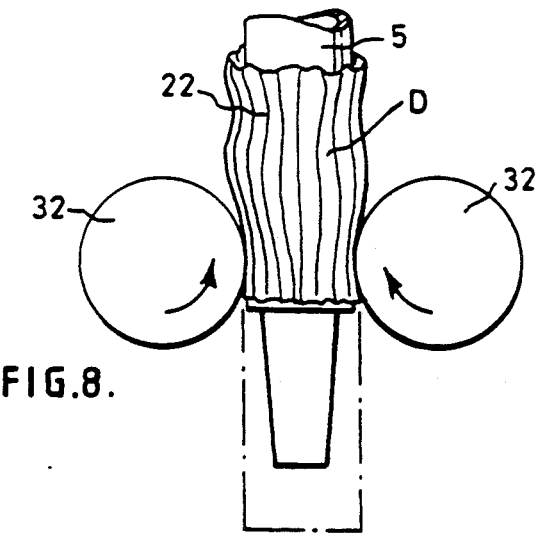
Figure 12:
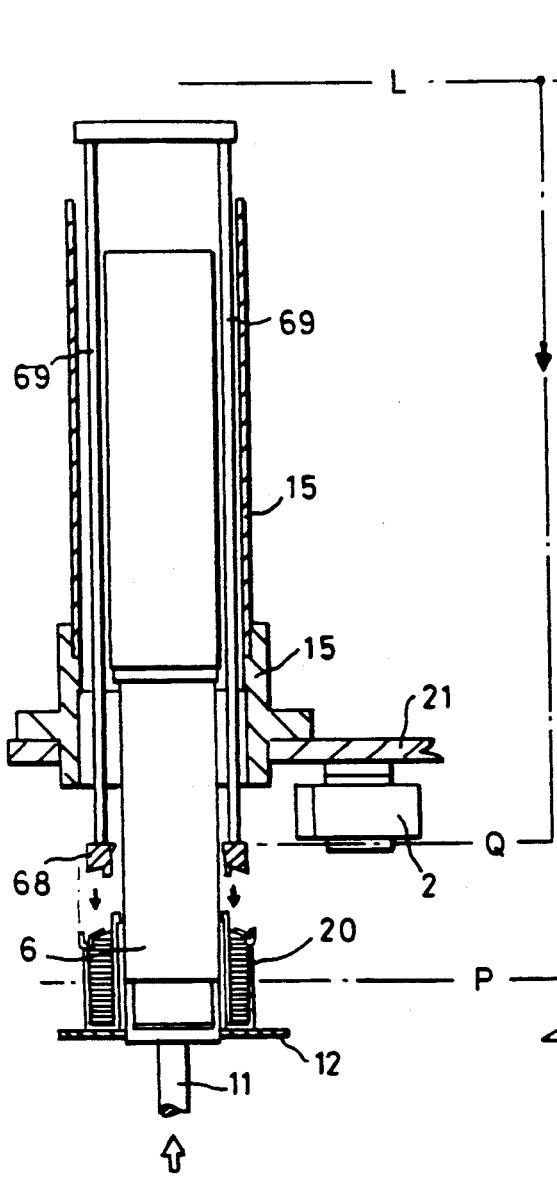
Figure 13:
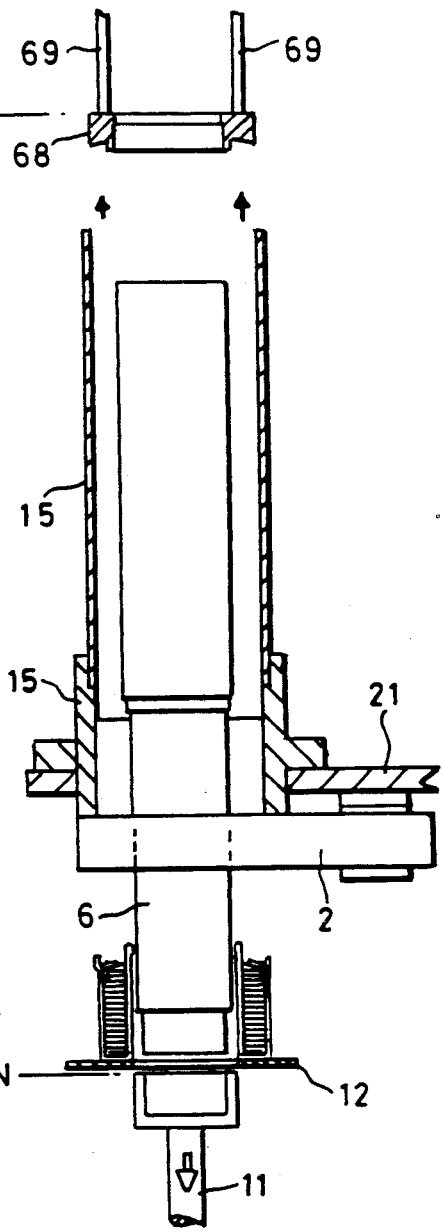

When the required tubing length has been accommodated the feed rollers 32 are stopped as also are the discs 53, 53a. The clamps 29 are then caused once more to engage the floating mandrel with the tubing 22 intervening and the platform 30 and mounting plate 31 are raised to return the floating mandrel 5 to the position A (FIG. 7). A hot wire 7 is then carried horizontally through the tubing to sever it between the floating mandrel 5 and central mandrel 6. Reverse rotation is then applied to the feed rollers 36 to withdraw the tubing 22 back to position D (FIG. 8).

The turntable is now indexed to carry the cassette body 20 to station II (FIG. 9). At this station a vertically reciprocable compression ring 56 carried by vertical rods 57 is traversed from position E to position F inside the body 20 to compress the layered tubing inside the body. The ring 56 is then raised again to position E to allow the turntable to be indexed so as to carry the cassette body to station III (FIG. 10).

At station III a compression ring 58 carried by vertical rods 59 is traversed from position E to position G inside the body 20 further to compress the layered tubing inside the body 20.

The cycle times of the movements of the rings 56 and 58 at stations II and III are the same as the cycle time of the operation of the mechanism at station I. This enables the rings comparatively gradually to compress the layered tubing in the body while any air trapped between the tubing layers escapes round the edges of the rings, clearance between the rings and body 20 and core 28 being provided for this.

The turntable is now indexed to carry the body 20 to station IV (FIG. 11) where an annular cap 60 is mounted over the cassette body 20. The cap 60 as well as the body 20 with its core 28 and base wall 61 are moulded from plastics material. The cap 60 is transferred from a stack to a location shown at the top of FIG. 11 between the top of the layering tube 15 and a placing ring 10 carried by vertically reciprocable rods 62 that force the placing ring 10 down between positions L and M to locate the cap 60 over the layered tubing between the body 20 and core 28 (see particularly FIG. 15). The cap 60 has an annular top 63 and a peripheral flange 64 which is a sliding fit inside the layering tube 15 and inside a slightly expanded portion 65 of the body 20 at the top thereof. This avoids any possibility of any tubing being trapped when the cap 60 enters the body 20. The cap presses the pleated part of the tubing slightly further so that, in order to retain the cap 60 in the body 20, three horizontally reciprocable piercing tools 17 equidistantly spaced round the body 20 can be operated simultaneously to force tabs 66 (FIG. 17) out of the body wall to engage a peripheral notch 67 round the periphery of the flange 64. The placing ring 10 retains the cap 60 sufficiently depressed for the tabs 66 to be formed before the placing ring is returned to position L. Clearance is provided between the top 63 of the cap and the cassette core 28 to enable the tubing to be drawn out of the cassette when the cassette is in use. Alternatively small projections may be formed in the body wall as initially constructed the projections being distributed around the body wall at a uniform height and projecting slightly inwards therefrom. Then the placing ring is used simply to snap the edge of the cap into position beneath the projections.

The turntable 21 is now indexed from station IV to station V (FIGS. 12 and 13) where the completed cassette is removed from the apparatus. For this purpose a support 11 is raised from position N to position P to support the central mandrel 6 before it has been released by the clamp 2. The withdrawal of the clamp 2 leaves the way clear for a pushing ring 68 on descending rods 69 to travel from position L to position Q transferring the cassette to a position where it falls away from the pushing ring 68 on to a platform 12. The pushing ring then returns to position L, the clamp 2 clamps the central mandrel 6 again and the support 11 goes back to position N. The way is then clear for the turntable 21 to carry the layering tube 15 and central mandrel 6 to station VI to receive another cassette body 20.

In the movement from station V to station VI the lower end of the central mandrel 6 carries the completed cassette to a position in which it falls from the platform 12 onto a conveyor 70 (FIG. 14).

It will be clear that various methods may be adopted for mounting the next cassette body between the central mandrel 6 and layering tube 15 at station VI (not shown in the drawings). For example the new body 20 can be transferred from a stack thereof to surround a location boss reciprocable towards and away from the bottom of the central mandrel 6. This boss contacts the mandrel while a top support contacts the top of this mandrel so that the mandrel is held against axial movement when the clamp 2 is opened. Thrust rods can then lift the body from the location boss to its location above the clamp 2 which can then be closed to hold the central mandrel again, the clamp being shaped to allow the thrust rods to descend from the turntable.

It has been found that the apparatus described above can pack 100 feet (30.48 m) of tubing in a cassette within 15 seconds and three loaded closed cassettes can be produced in one minute. It is thought that with improved driving machinery these speeds can be exceeded. Mechanical, electrical, pneumatic or hydraulic driving means for the step-by-step or reciprocating movements of the parts requiring such movement in timed relationship can readily be designed by those skilled in the art so that such means are not described in this specification.

Various modifications of the mechanisms described above are possible without departing from the scope of the following claims. For example the layered packs of tubing can be formed between the central mandrel 6 and layering tube 15 without any intervening container such as the cassette body 20. Each pleated pack can then be removed downwards between a pair of reciprocable rings, after the clamp 2 has been opened, the pack being carried to a point where it can be bound, clipped or encased for removal to the point where it is required.

It will be understood that the layering tube need not be a simple imperforate tube but may have apertures therein or it may be constituted by a plurality of parts such as parallel rods arranged to define a tubular envelope surrounding the layered or pleated tubing.

We claim:

1. Apparatus for producing a series of layered packs of tubing from a length of flexible, non-resilient tubing, the apparatus comprising a layering tube having an internal diameter determined by the external diameter of each layered pack to be produced, a central mandrel mounted concentrically inside said layering tube and having an external diameter determined by the internal diameter required for each said layered pack, whereby an annular passage is formed between said layering tube and said central mandrel, means closing said annular passage at one end thereof, means for feeding flexible, nonresilient tubing having a diameter appreciably larger than that of said central mandrel into said passage at a rate such that the tubing gathers in a ring about said central mandrel, reciprocable means inside said passage for compacting the tubing into layers as it gathers towards said closed end of said passage, driving means for reciprocating said reciprocable means in timed relationship with the operation of said feeding means and means for severing a portion of the tubing when so compacted from a remaining portion of the tubing, said means closing said annular passage being mounted for movement to enable said severed compacted tubing to be discharged from said passage as a layered pack.

2. Apparatus according to claim 1, arranged for each layered pack to be formed inside a respective individual annular container having an outer wall fitting the inside of said layering tube and a tubular core fitting said central mandrel.

3. Apparatus according to claim 1, including a floating mandrel mounted coaxially with said central mandrel for movement between a first position in which it constitutes a continuation of said central mandrel and a second position in which there is an end to end separation between said central mandrel and said floating mandrel, and means for traversing said severing means between said central mandrel and said floating mandrel when in said second position for severing said portion of the tubing, said feeding means including power driven means adapted to be moved between said first and second positions with said floating mandrel for delivering the tubing over said floating mandrel and said central mandrel from a source of such tubing to gather in said layering tube.

4. Apparatus according to claim 3, in which said power driven means comprises a plurality of drive rollers distributed round said floating mandrel and an equal plurality of pinch rollers mounted to rotate freely in said floating mandrel and positioned for the tubing wall to be engaged between each drive roller and an associated one of said pinch rollers.

5. Apparatus according to claim 3, in which said severing means comprises a wire to be traversed when hot laterally through the tubing by said traversing means.

6. Apparatus according to claim 3, including tubing delivery means for delivering the tubing in a flattened condition to said feeding means and compressed air supply means, said floating mandrel being formed at its end remote from said cental mandrel to fill the cross-sectional area of the tubing when fully opened out from the flattened condition, and said central mandrel and said floating mandrel being formed with axial passages for the supply of compressed air therealong from said compressed air supply means when said floating mandrel is in said first position, to produce an air bubble in the tubing as it approaches said end of said floating mandrel thereby facilitating the passage of the tubing along said floating and central mandrels.

7. Apparatus according to claim 1, including power driven rollers for withdrawing the tubing in a flattened condition from a wall thereof, an elongated reservoir for receiving at one end thereof flattened tubing received from said power driven rollers for containing an amorphous mass thereof, the apparatus further including guide means for guiding the tubing from the other end of said reservoir to said feeding means by way of the end of said floating mandrel remote from said central mandrel and the apparatus also including distending means for opening the tubing from its flattened condition on approaching said floating mandrel.

8. Apparatus according to claim 1, in which said reciprocable means for compacting the tubing into layers comprises reciprocable shoes for engaging the tubing externally and said driving means comprises longitudinally extending stems respectively connecting said shoes to actuating mechanism beyond the end of said layering tube remote from said closed end.

9. Apparatus according to claim 8, in which said shoes are mounted in two groups thereof, the shoes in one group being interdigitated with the shoes in the other group circumferentially in said annular passage and said actuating mechanism being constructed to reciprocate the two groups out of phase with one another.

10. Apparatus according to claim 3, in which said reciprocable means for compacting the tubing into layers comprises reciprocable shoes for engaging the tubing externally and said driving means comprises longitudinally extending stems respectively connecting said shoes to actuating mechanism mounted on said floating mandrel to move therewith between said first and second positions and to impart reciprocating movement to said shoes when said floating mandrel is in said first position.

11. Apparatus according to claim 3, in which said reciprocable means for compacting the tubing into layers comprises two groups of reciprocable shoes for engaging the tubing externally and mounted in two groups thereof, the shoes in one group being interdigitated with those of the other group circumferentially in said annular passage and said driving means includes two rings encircling said floating manual and connected respectively to said two groups of shoes by stems and further includes mechanism mounted for moving with said floating mandrel between said first and second positions, said mechanism being operative to reciprocate said rings with their two groups of shoes respectively out of phase with one another when said floating mandrel is in said first position.

12. Apparatus according to claim 4, in which said power driven means are mounted for movement with said floating mandrel between said first and second positions.

13. Apparatus according to claim 4, in which said power driven means includes a ring of shafts substantially encircling said floating mandrel and including drive shafts allocated respectively to said drive rollers, intervening shafts mounted to rotate about axes perpendicular to the axis as said floating mandrel and universal joints interposed between each drive shaft and adjacent ones of said intervening shafts, band drive means interposed between each drive shaft and the associated one of said drive rollers and a motor for driving one of said intervening shafts.

14. Apparatus according to claim 1, including a turntable, said layering tube and said central mandrel being mounted on said turntable in a position to be indexed through a series of locations at which each layered pack can be subjected to a particular treatment, in the first of which locations are located said means for feeding the tubing, said reciprocable means, said driving means for reciprocating said reciprocable means and said means for severing a portion of the tubing.

15. Apparatus according to claim 14, including at a second of said locations a reciprocable pressure ring for compressing a layered pack carried by said turntable from said first location and means for reciprocating said pressure ring.

16. Apparatus according to claim 14, including at a further one of said locations means for compressing a lid on an open annular container when a layered pack in such a container is carried by said turntable to said further one of said locations and also including at said further one of said locations means for latching the lid to the container.

17. Apparatus according to claim 14, in which said means closing said annular passage at one end thereof is a split clamp secured by pivotal means to said turntable and operative to secure said central mandrel to said turntable, one of the said locations to which said turntable is indexed being dedicated to the discharge of each layered pack from the apparatus, the apparatus including at this location means for thrusting a layered pack through said one end of said annular passage when said clamp is opened, a platform for receiving the pack when so discharged from said annular passage and a reciprocable support beneath said clamp for supporting said central mandrel while said clamp is disengaged therefrom.

18. Apparatus according to claim 3, including a first support for said power driven means, a second support for said driving means for said reciprocable means, said supports being movable along the axis of said floating mandrel, and clamping means for clamping the tubing to said floating mandrel while securing said floating mandrel to said second support and while said floating mandrel is carried from said second position to said first position and thereupon releasing said floating mandrel when in said first position.

* * * * *